Figure 1:
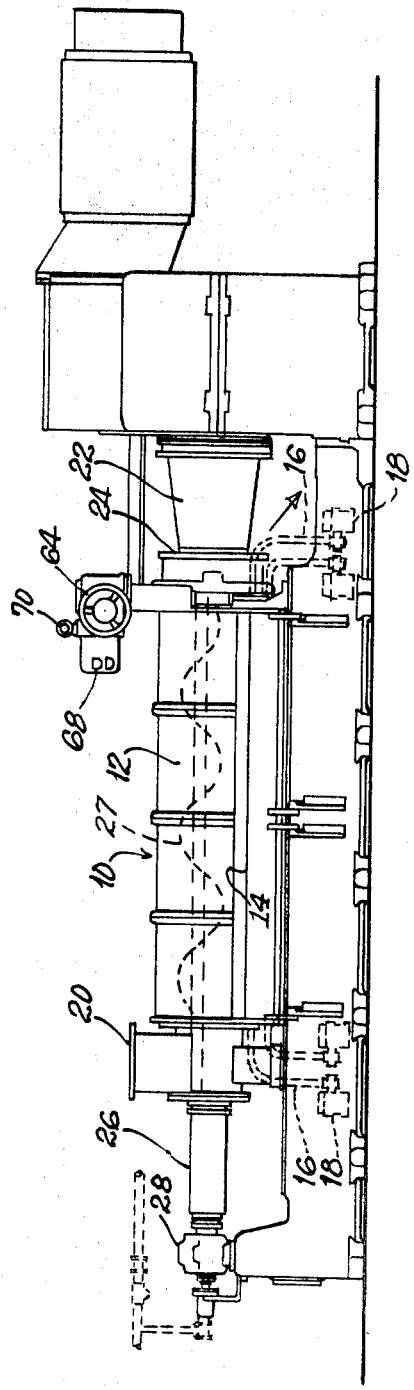

United States Patent

[11] 3,593,655

[72] Inventor Elmer E. Prescott
   Baton Rouge, La.
[21] Appl. No. 795,664
[22] Filed Jan. 31, 1969
[45] Patented July 20, 1971
[73] Assignee Copolymer Rubber & Chemical Corporation
   Baton Rouge, La.

[54] MEANS FOR EXTRACTING WATER FROM ELASTOMERIC MATERIALS
3 Claims, 5 Drawing Figs.
[52] U.S. Cl. .................................... 100/148, 18/12, 100/117, 100/127
[51] Int. Cl. .................................... B30b 3/02
[50] Field of Search ........................... 18/12 SN, 12 SE; 107/14 C; 100/37, 110, 117, 126, 143, 127, 148, 149, 48

[56] References Cited
UNITED STATES PATENTS

| | | | |
|---|---|---|---|
| 1,765,389 | 6/1930 | Wendler | 100/49 |
| 2,903,960 | 9/1959 | Zies | 100/148 |
| 3,092,017 | 6/1963 | French et al. | 100/117 X |
| 3,276,353 | 10/1966 | Burner et al. | 100/117 X |
| 3,518,936 | 7/1970 | Bredesor | 100/117 |

Primary Examiner—Billy J. Wilhite
Attorney—McDougall, Hersh, Scott and Ladd

ABSTRACT: A device for squeezing excess water from prepared elastomeric polymeric materials by a device corresponding to a French Oil Mill having an exit opening in the form of a cone section formed with a forward passage dimensioned to correspond to the cross section of the die plate and a rearward passage of larger dimension and means for axial displacement of the cone section relative to the die plate for location of the die plate between the sections of larger or smaller dimension.

INVENTOR
Elmer E. Prescott
by McDougall, Hersh, Scott
and Ladd
Attys

PATENTED JUL 20 1971

3,593,655

SHEET 2 OF 2

MEANS FOR EXTRACTING WATER FROM ELASTOMERIC MATERIALS

This invention relates to the removal of free water from particles of elastomeric material prior to the packaging of the elastomeric material for use or shipment and relates more particularly to the preparation of synthetic elastomeric materials and the removal of water introduced for coagulation of the elastomeric polymeric materials during their final stages of preparation.

The invention will be described with reference to the manufacture of EPDM rubbers, such as described in the copending application of Ginn, Ser. No. 569,863, filed Aug. 3, 1966, now abandoned, and entitled "Preparation of Elastomers." It will be understood, however, that the concepts of this invention will have equal application for the removal of water during the preparation of a wide variety of other elastomeric materials formed by polymerization of mono-olefinic conjugated diolefinic, or polyolefinic compounds in aqueous or solvent medium and wherein the formed polymeric materials are separated out by the addition of water and the like to coagulate the elastomeric polymeric materials in the form of crumb or particles. Representative of such other synthetic elastomeric polymeric elastomers, are SBR rubbers, butadienestyrene rubbers, butadiene-acrylonitrile rubbers, butyl rubbers, chloroprene and isoprene and the like.

If, following coagulation, the polymeric elastomer particles are subjected to a first dewatering step for removal of the major portion of free water, as by conventional filtering or decanting operations, preferably as a continuous operation with a rotary vacuum filter, the rubber particles will still normally contain a substantial amount of free water which may range from 40 to 75 percent by weight and usually about 45 to 50 percent by weight, when calculated on the net basis. It is desirable to effect removal of the major portion of the remaining amount of free water to provide an uncured elastomeric polymer having only a small percentage of water before packaging for shipment to the ultimate user for use in the fabrication of elastomeric products, such as tubing, belts, tires and the like.

It is known to effect removal of free water from such wet particles of elastomeric material by subjecting the material to a squeezing action during processing through a conventional piece of equipment, known as a French Oil Mill. This is a machine wherein the solid material is advanced axially through a tubular housing by means of a screw which subjects the solid material to increasing pressure as it is advanced through the housing and extruded through an orifice at the forward end thereof. The barrel of the machine, through which the solids are displaced under pressure, is foraminous to provide a multiplicity of openings through which the liquids, such as oils from seeds or water squeezed from the elastomeric particles can flow. A die plate on the end of the screw cooperates with a cone at the outlet end of the tubular section to block the opening so that the material is forced to extrude through an opening in the die plate to build up the desired back pressure in the mill.

For elastomeric materials of conventional viscosity, such as 50—55 Mooney rubber, continuous and satisfactory operation can be achieved with the conventional French Oil Mill for dewatering wet crumb or other coagulated particles of wet rubber. However, serious difficulties are encountered when attempts are made to process rubbers of higher Mooney values. Typical of such difficulties are the melting of the rubber, burning of the rubber, plugging the discharge end of the machine, and general failure of the machine due to overload and the like.

It is an object of this invention to effect modification of the conventional French Oil Mill machine to adapt the machine for continuous and universal use in the removal of water from rubber or elastomeric materials of high viscosity as well as low viscosity and it is a related object to provide a machine of the type described which is capable of adjustment to relieve overload during use, which is capable of continuous operation without stoppage during operation with rubber of high viscosity as well as rubber of low viscosity, which remains effective for efficient removal of free water, which is capable of operation with rubber of various Mooney values without causing burning of the rubber or plugging of the openings and which is simple of construction and easy in operation for the removal of water from rubber polymer particles.

Figure 2:
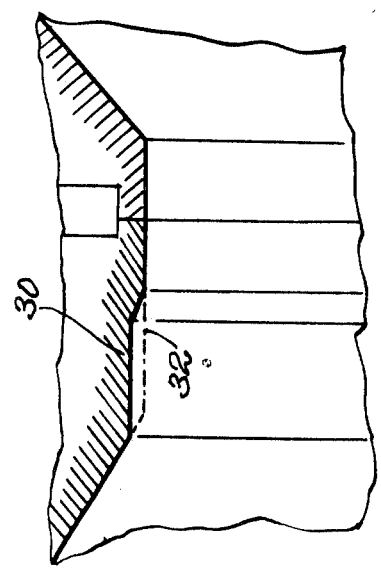
Figure 3:
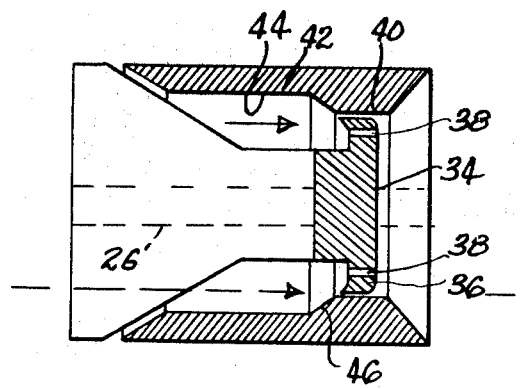
Figure 4:
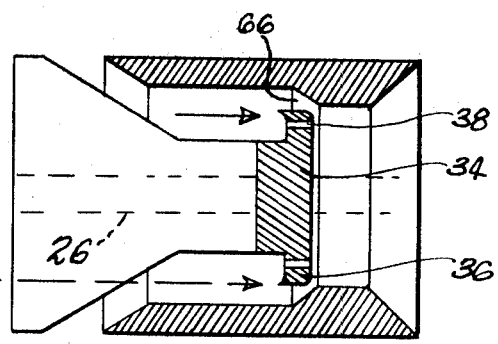
Figure 5:
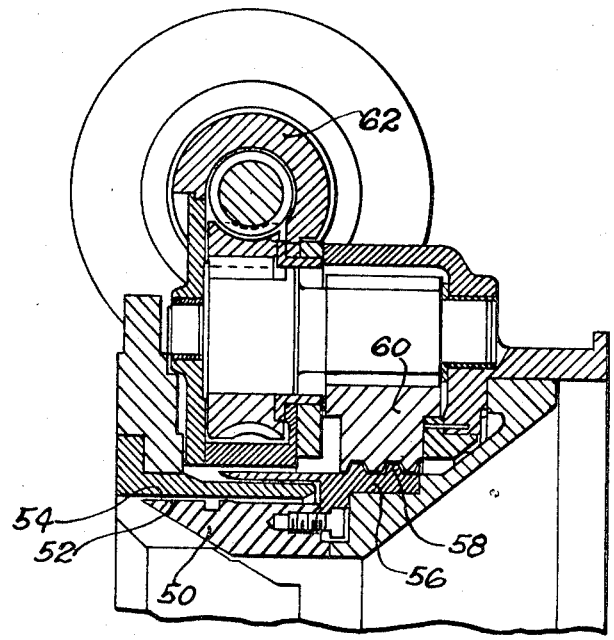

These objects and advantages of this invention will hereinafter appear and, for purposes of illustration, but not of limitation, an embodiment of the invention is shown in the accompanying drawings in which, FIG. 1 is a side view of a machine embodying the features of this invention, FIG. 2 is a schematic elevational view which illustrates the conventional construction of the die plates and cone section of a conventional machine, FIG. 3 is a schematic sectional elevational view, similar to that of FIG. 2, showing modification of the die plate section with the elements in closed or normal operating position, FIG. 4 is a schematic elevational view similar to that of FIG. 3, showing the elements of the die plate and cone section in bypass or open position, and FIG. 5 is a sectional elevational view of the outlet end portion of the machine, showing in detail the cone and die plate construction embodying the features of this invention.

Except for the outlet end portion, the die plate and cone, the machine identified as a French Oil Mill, is of conventional construction, such that detailed description thereof need not be given. Suffice it to say that the mill comprises an elongate horizontally disposed housing 10 of cylindrical shape having a foraminous outer wall 12 through which expressed liquids can drain into a trough 14 and through connecting conduits 16 into traps 18 for delivery to waste. A hopper 20 communicates with an inlet at the feed end of the cylindrical housing while a shredder 22 is disposed adjacent the outlet end 24 of the cylindrical housing for purposes of subdividing the rubber, issuing as an extrusion from the outlet opening.

A shaft 26, driven by motor 28, extends axially through the cylindrical housing and is mounted for rotational movement. Fixed to the shaft for rotational movement therewith is a screw 27 of variable pitch operated within the housing to effect displacement of the feed material from the inlet to the outlet with increasing pressure to express water from the elastomeric material as it is advanced from the feed end to the outlet end of the housing. The shaft extends beyond the outlet end portion of the cylindrical housing and the shredder 22 is mounted for rotational movement in the opposite direction on the through extending portion for rotational movement therewith.

At the outlet end portion of the conventional mill, the cylindrical housing is provided with a cone 30 of cylindrical shape having a central bore 32. The corresponding portion of the shaft 26 is provided with a die plate 34 having an annular flange portion 36 dimensioned to correspond with the circular cross section of the bore 32 for rotational movement of the die plate within the cone, in a manner to effect substantial closure of the outlet end portion of the cylindrical housing while enabling continuous rotational movement of the screw and shaft. The flanged portion 36 of the die plate 34 is provided with a plurality of openings 38 extending axially therethrough for passage, as an extrusion, of the rubber from which the water has been expressed during displacement through the mill.

It is believed that failure of the mill stems, at least in part, from the inability of the material to extrude through the die openings 38 without excessive load, especially during the initial surge whereby excessive pressure and temperature develop to cause melting and burning of the rubber and whereby overload causes stoppage of the mill with its consequent problems of unloading and the like.

In accordance with the practice of this invention, these problems have been eliminated by modifications of the internal cylindrical face of the cone 30 to provide a forward portion 40 having a bore 32 of normal dimension, having a radius dimensioned to be slightly greater than the radius of the flanged end portion of the die plate to enable rotational movement thereof while limiting passage of the rubber material to the die plate openings 38. The internal cylindrical face of the cone is provided further with a rearward portion 42 having a bore 44 of larger radius than the bore 32 with a tapered portion 46 connecting the forward bore 32 of smaller cross section with the rearward bore 44 of larger cross section. The cone 30 is mounted for limited axial movement relative to the die plate 34 between normal or closed position, with the die plate disposed for rotational movement within the bore 32 of smaller dimension, and bypass or open position, with the die plate located within the bore 44 of larger dimension.

The cone 30 extends from the forward end of the cylindrical housing in sealing engagement therewith, as a continuation of the housing, during relative movement. For this purpose, as illustrated in FIG. 5, the outer rearward end portion 50 of the cone is formed with a cylindrical slide surface 52 which is in continuous sealing engagement with an inner cylindrical face 54 on the forward end portion of the housing during movement of the cone between open and closed positions. For this purpose, the cone is provided with a cone adjusting screw 56 having its teeth 58 in meshing engagement with a bull gear 60 mounted on the cone frame for rotational movement. The bull gear 60 is turned in one direction or the other by a worm drive 62 which is operated either manually by the hand wheel 64 or by a motor controlled by pushbutton 68 with reducing gears in between to reduce the axial displacement of the cone. The position of the cone is shown by the indicator 70.

With reference to FIGS. 3 and 4, it will be seen that when the cone is in normal or closed position with the die plate operating within the forward end portion of the cone (FIG. 3), the end of the cylinder is substantially closed by the die plate and the material is limited to extrusion from within the cylinder through the die openings 38. When the cone is displaced to open position, with the die plate 34 located within the rearward portion of the cone, as illustrated in FIG. 4, an annular passage 66 exists between the flanged edge portion of the die plate 34 and the cone to provide a bypass through which the material may flow around the die plate thereby to relieve back pressure on the material.

In practice, when processing rubber material which normally does not present any difficulties during processing, such as rubbers of 40 Mooney or less, the machine can be operated continuously with the cone in closed position.

When processing materials that present problems during start-up because of an initial surge, such as with 50—75 Mooney rubber, the mill is started with the cone in open position, as shown in FIG. 4, so that the initial material can bypass the die plate to relieve back pressure. After stable conditions have been achieved, the cone can be gradually displaced from opened to closed position for normal operation without difficulty. Thus the initial breakdown experience from the initial range is eliminated to enable continuous normal operation.

When processing rubber material having Mooney values too high for normal operation with the cone in normal closed position, the cone is displaced rearwardly to open position to compensate for the initial surge and then it is moved forward, when normal stable operation has been achieved, to a position intermediate opened and closed position to enable a portion of the rubber to bypass the die plate while the remainder extrudes in the normal manner through the die plate openings to provide for stabilized continuous operation of the machine.

It will be apparent from the foregoing that the device provides a simple and efficient means for the expression of free water from rubber in a mill wherein stabilized continuous operation can be achieved independent of the differences in viscosity of the rubber material processed therethrough. Thus continuous and efficient removal of water can be achieved from rubbers of different composition and characteristics.

It will be understood that changes may be made in the details of construction, arrangement and operation, without departing from the spirit of the invention, especially as defined in the following claims.

I claim:

1. In a mill of the type described for removal of water from coagulated elastomeric polymeric material in which the mill is formed of a cylindrical section having an exit portion formed of a cone having a central passage extending axially therethrough and a die plate dimensioned to correspond with the cross-sectional dimension of the passage through the cone and mounted for rotational movement therein on a shaft extending through said cylindrical section with openings extending through the die plate for the extrusion of material from within the cylindrical section, and a screw mounted on said shaft for rotational movement in the cylindrical section for advancement of the material under pressure through the cylindrical section to the exit opening, the improvement comprising means to rotate said shaft, a cone having a forward passage and axially aligned rearward passages of different dimension including one passage dimensioned to correspond closely to the diameter of the die plate and another passage having a diameter larger than the first passage and means for axial displacement of the cone relative to the die plate between substantially closed position with the die plate located in the passage of smaller dimension to substantially close the passage, and open position with the die plate located in the passage of larger dimension to provide an annular spaced between the cone and die plate through which the material can bypass the die plate during passage from within the cylindrical section.

2. A mill as claimed in claim 1 in which the passage of smaller dimension is in the forward position of the cone and the passage of larger dimension is spaced rearwardly thereof.

3. A mill as claimed in claim 1 in which the passages of smaller and larger dimension are interconnected by a tapered portion to define an intermediate passage section of variable dimension for variation of the annular space about the die plate through which the material is bypassed when the die plate is positioned intermediate the open and closed positions.